US011888174B2

(12) United States Patent
Östman

(10) Patent No.: US 11,888,174 B2
(45) Date of Patent: Jan. 30, 2024

(54) CONTACTOR BOX AND A BATTERY FOR AN ENERGY STORAGE SYSTEM OF AN ELECTRICAL VEHICLE

(71) Applicant: VOLVO TRUCK CORPORATION, Gothenburg (SE)

(72) Inventor: Bill Östman, Askim (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 162 days.

(21) Appl. No.: 17/363,971

(22) Filed: Jun. 30, 2021

(65) Prior Publication Data
US 2022/0006154 A1    Jan. 6, 2022

(30) Foreign Application Priority Data

Jul. 2, 2020   (EP) .................................... 20183729

(51) Int. Cl.
*H01M 50/298*   (2021.01)
*B60L 50/64*    (2019.01)
*H01M 50/249*   (2021.01)

(52) U.S. Cl.
CPC ........... *H01M 50/298* (2021.01); *B60L 50/64* (2019.02); *H01M 50/249* (2021.01); *H01M 2220/20* (2013.01)

(58) Field of Classification Search
None
See application file for complete search history.

(56) References Cited

U.S. PATENT DOCUMENTS 5,882,213 A * 3/1999 Witek ................. B60R 16/0238
                                                           439/76.2
8,691,416 B1 * 4/2014 Carroll ................ H01M 50/204
                                                           429/100

FOREIGN PATENT DOCUMENTS

| CN | 208035956 U     | 11/2018 |           |
|----|-----------------|---------|-----------|
| CN | 109228868 A     | 1/2019  |           |
| EP | 1369305 A2      | 12/2003 |           |
| JP | 2017162706 A *  | 9/2017  | H01M 10/425 |

OTHER PUBLICATIONS

Machine Translation of JP-2017162706-A. (Year: 2017).*
European Search Report dated Dec. 22, 2020 in corresponding European Patent Application No. 20183729.1, 7 pages.

* cited by examiner

*Primary Examiner* — Gregg Cantelmo
(74) *Attorney, Agent, or Firm* — Venable LLP; Jeffri A. Kaminski

(57) ABSTRACT

The present disclosure relates to a contactor box (201) for an electrical energy storage system (200) of an at least partly electrical vehicle (100). The contactor box (201) comprises a first ingoing high voltage connection (203a) adapted to be connected to a second ingoing high voltage connection (203b) of a battery (210). The contactor box (201) comprises a first outgoing high voltage connection (205a) adapted to be connected to a second outgoing high voltage connection (205b) of the battery (210). The first ingoing and the first outgoing high voltage connections (203a, 205a) are adapted to be disengaged from the battery (210) when the contactor box (201) is removed from the vehicle (100), and adapted to be engaged with the battery (210) when the contactor box (201) is inserted into the vehicle (100).

7 Claims, 3 Drawing Sheets

CONTACTOR BOX AND A BATTERY FOR AN ENERGY STORAGE SYSTEM OF AN ELECTRICAL VEHICLE

TECHNICAL FIELD

The invention relates to a contactor box, a battery and an electrical Energy Storage System (ESS) of an at least partly electrical vehicle.

The invention can be applied in at least partly electrical heavy-duty vehicles, such as trucks, buses and construction equipment etc. Although the invention will be described with respect to a fully electrified truck, the invention is not restricted to this particular vehicle, but may also be used in other vehicles such as buses, trailers, wheel loaders, excavators, passenger cars, marine vessels etc. It may also be applied in electrical systems of e.g. electrically operated vessels and in various working machines. It is applicable in fully electrically operated vehicles as well as in hybrid vehicles, comprising also a combustion engine.

The invention may also be applied in electrical systems of e.g. electrically propelled and operated vessels and in various working machines. It may further be applied in stationary electrical ESS', such as in smart grid or back-up power supply systems.

BACKGROUND

An electrical ESS is used to power the electric motor of an at least partly electrical vehicle. For a fully electrical vehicle, the electrical ESS may be the only on-board energy source and the only on-board energy source used for operating the vehicle. For a partly electrical vehicle, e.g. a hybrid vehicle, the electrical ESS may be one of multiple on-board energy sources used for operating the vehicle. The electrical ESS is located on-board the vehicle.

The electrical ESS comprised in a vehicle comprises multiple components such as e.g. one or more batteries, a contactor box etc. The one or more batteries, also referred to as traction batteries, may be of any suitable type such for example lithium-ion batteries, lithium polymer batteries, fuel-cell batteries, lead-acid batteries, nickel metal hydride batteries etc. The one or more batteries are typically rechargeable batteries. A contactor box, also referred to as a service box, comprises intelligent components of the electrical ESS such as contactors, a Battery Monitoring Unit (BMU), fuses, sensors, cooling system etc. High voltage cables are connected to the electrical ESS through which high voltages, e.g. traction voltages, goes when supplying power to drive the electrical motor of the at least partly electrical vehicle. High voltage may be for example in the range of 400-800V. Today, the high voltage cables from the ESS, and thereby from the contactor box, are connected with a levered connector that requires considerable manual involvement to release and to connect the contactor box. In case of welded, or risk for welded, contactors or other contactor related error there is today no given way to operate. Also, there is a risk that voltage and current is present, whereby a removal of high voltage connections is not safe.

Therefore, there is a need to at least mitigate or solve this issue.

SUMMARY

An object of the invention is to provide improved handling of high voltages in an at least partly electrical vehicle.

According to a first aspect of the invention, the object is achieved by a contactor box for an electrical energy storage system of an at least partly electrical vehicle according to claim 1. This contactor box comprises a first ingoing high voltage connection adapted to be connected to a second ingoing high voltage connection of a battery and through which ingoing high voltage is provided from the battery. The contactor box comprises a first outgoing high voltage connection adapted to be connected to a second outgoing high voltage connection of the battery and through which outgoing high voltage is provided out to at least one power consuming part of the vehicle. The first ingoing high voltage connection and the first outgoing high voltage connection are adapted to be disengaged from the battery when the contactor box is removed from the vehicle, and adapted to be engaged with the battery when the contactor box is inserted into the vehicle.

By the provision of a contactor box which comprises the first ingoing high voltage connection and the first outgoing high voltage connection adapted to be disengaged from the battery when the contactor box is removed from the vehicle, and adapted to be engaged with the battery when the contactor box is inserted into the vehicle, the advantage of an easy and safe removal and installation of the contactor box is provided. When removing the contactor box from the vehicle, e.g. by simply pulling or lifting the contactor box out of the vehicle the risk related to voltage and current that may be present is reduced.

With the first ingoing high voltage connection and the first outgoing high voltage connection, the contactor box can be easily removed from the vehicle by e.g. simply pulling or lifting the contactor box out of the vehicle. There is no need for any manual disconnection of the first ingoing high voltage connection and the first outgoing high voltage connection before removing the contactor box as they are automatically disconnected when removing the contactor box. This is in contrast to today's levered connectors which require manual disconnection before the contactor box can be removed.

According to one embodiment, the contactor box may be adapted to be attached to the battery by means of a contactor box fastening device. The contactor box fastening device may for example be in the form of a screw, a nail, a bolt, a magnet or any other suitable releasable fastening device. An advantage with the contactor box fastening device is that it improves the fastening of the contactor box to the battery, and prevents the contactor box from getting out of position on the battery for example when the at least partly electrical vehicle is subject to vibrations when it moves on a bumpy road.

According to a further embodiment, the contactor box may comprise a handle mounted on an outside of the contactor box. An advantage of the handle is that it becomes easier to remove and insert the contactor box in the at least partly electrical vehicle. The handle is easy to grip by the personnel that removes and/or inserts the contactor box. The handle also enables a safe and controlled removal and insertion of the contactor box.

According to a further embodiment, the first ingoing high voltage connection and the first outgoing high voltage connection may be of the same or different type. With connections of the same type, it makes the installation of the connections on the contactor box easier since the installation personnel only needs to have knowledge of installation of one connection type instead of several types. With connections of different types, it provides an advantage of enabling use of tailored connections for ingoing high voltage and outgoing high voltage, as the ingoing and outgoing high voltage connections may have different features or demands.

According to a further embodiment, the first ingoing high voltage connection and the first outgoing high voltage connection may be located on the same side of the contactor box. Since they are located on the same side, it provides the advantage of easy mounting of the two connections and also easy access in case of service or inspection.

According to a further embodiment, the first ingoing high voltage connection and the first outgoing high voltage connection are located on the outside of the contactor box. An advantage of this is that it further improves the easy removal and insertion of the contactor box. Furthermore, the outside location makes the first ingoing high voltage connection and the first outgoing high voltage connection easy to mount and it provides easy access when service or inspection of the connections is needed.

According to a second aspect of the invention, the object is achieved by a battery for an electrical energy storage system of an at least partly electrical vehicle. The battery comprises a second ingoing high voltage connection adapted to be connected to a first ingoing high voltage connection of a contactor box and through which ingoing high voltage is transferred from the battery. The battery comprises a second outgoing high voltage connection adapted to be connected to a first outgoing high voltage connection of the contactor box and through which outgoing high voltage is provided out to at least one power consuming part of the vehicle. The second ingoing high voltage connection and the second outgoing high voltage connection are adapted to be disengaged from the contactor box when the contactor box is removed from the vehicle and adapted to be engaged with the contactor box when the contactor box is inserted into the vehicle.

By the provision of a battery which comprises the second ingoing high voltage connection and the second outgoing high voltage connection adapted to be disengaged from the contactor box when the contactor box is removed from the vehicle, and adapted to be engaged with the contactor box when the contactor box is inserted into the vehicle, the advantage of an easy and safe removal and installation of the contactor box is provided. When removing the contactor box from the vehicle, e.g. by simply pulling or lifting the contactor box out of the vehicle, the risk related to voltage and current that may be present is reduced.

According to one embodiment, the second outgoing high voltage connection may be adapted to be mounted on the battery via a battery fastening device. The battery fastening device may be releasable or non-releasable. The battery fastening device may be a screw, a bolt, a nail, a weld etc. An advantage with the battery fastening device is that it improves the fastening of the second outgoing high voltage connection to the battery, and prevents the second outgoing high voltage connection from getting out of position on the battery for example when the at least partly vehicle is subject to vibrations when it moves on a bumpy road. When the battery fastening device is releasable, it provides an advantage of enabling removal of the second outgoing high voltage connection in case of the need for service or inspection.

According to a further embodiment, the second ingoing high voltage connection and the second outgoing high voltage connection may be adapted to be located on the same side of the battery. Since they are located on the same side, it provides the advantage of easy mounting of the two connections and also easy access in case of service or inspection.

According to a further embodiment, the second ingoing high voltage connection and the second outgoing high voltage connection may be located on the outside or the inside of the battery. An advantage of the outside location is that it further improves the easy removal and insertion of the contactor box from the battery. Furthermore, the outside location makes the second ingoing high voltage connection and the second outgoing high voltage connection easy to mount and it provides easy access when service or inspection of the connections is needed. An advantage of the inside location is that it protects the second ingoing high voltage connection and the second outgoing high voltage connection from dirt and unauthorized access.

According to a third aspect of the invention, the object is achieved by an electrical energy storage system for an at least partly electrical vehicle. The electrical energy storage system comprises a battery and a contactor box. By the provision of the electrical energy storage system which comprises the battery and the contactor box, an improved electrical energy storage system is provided with the advantage of an easy and safe removal and installation of the contactor box. When removing the contactor box from the vehicle, e.g. by simply pulling or lifting the contactor box out of the vehicle, the risk related to voltage or current that may be present is reduced.

According to a fourth aspect of the invention, the object is achieved by an at least partly electrical vehicle. The at least partly electrical vehicle comprises a contactor box and a battery, and/or the at least partly electrical vehicle comprises an electrical energy storage system.

By the provision of the at least partly electrical vehicle which comprises the battery and the contactor box, an improved at least partly electrical vehicle is provided with the advantage of an easy and safe removal and installation of the contactor box. When removing the contactor box from the vehicle, e.g. by simply pulling or lifting the contactor box out of the vehicle, there is no risk related to voltage and current that may be present.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

The drawings are not necessarily to scale and the dimensions of certain features may have been exaggerated for the sake of clarity. Emphasis is instead placed upon illustrating the principle of the embodiments herein.

DETAILED DESCRIPTION OF EXAMPLE EMBODIMENTS OF THE INVENTION

Figure 1:
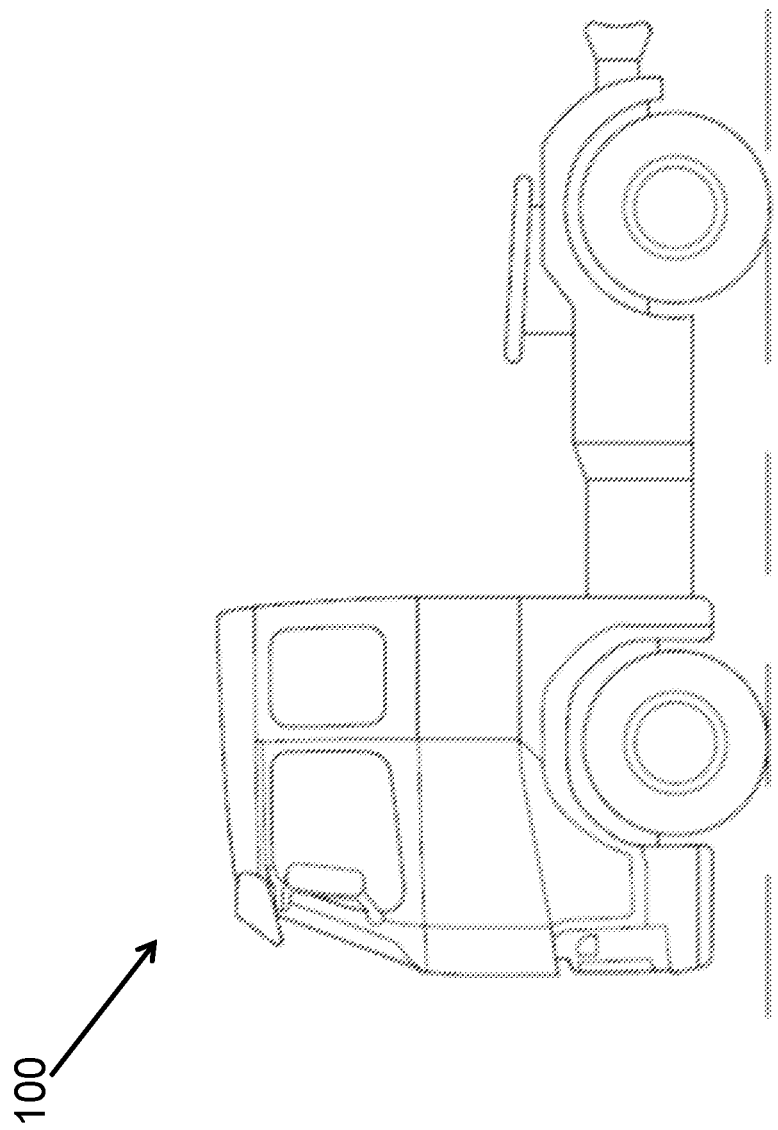
FIG. 1 is a schematic drawing illustrating an at least partly electrical vehicle.

FIG. 1 illustrates an at least partly electrical vehicle 100. The at least partly electrical vehicle 100 may be fully electrical driven or it may be partly electrical driven vehicle.

The term vehicle may be used herein for the sake of simplicity when referring to the at least partly electrical vehicle.

The vehicle 100 may be a heavy-duty vehicle, such as a truck, bus, construction equipment, trailer, wheel loader, excavator, passenger car, a marine vessel, an electrically operated vessel, a working machine, stationary backup power solution etc.

Figure 2:
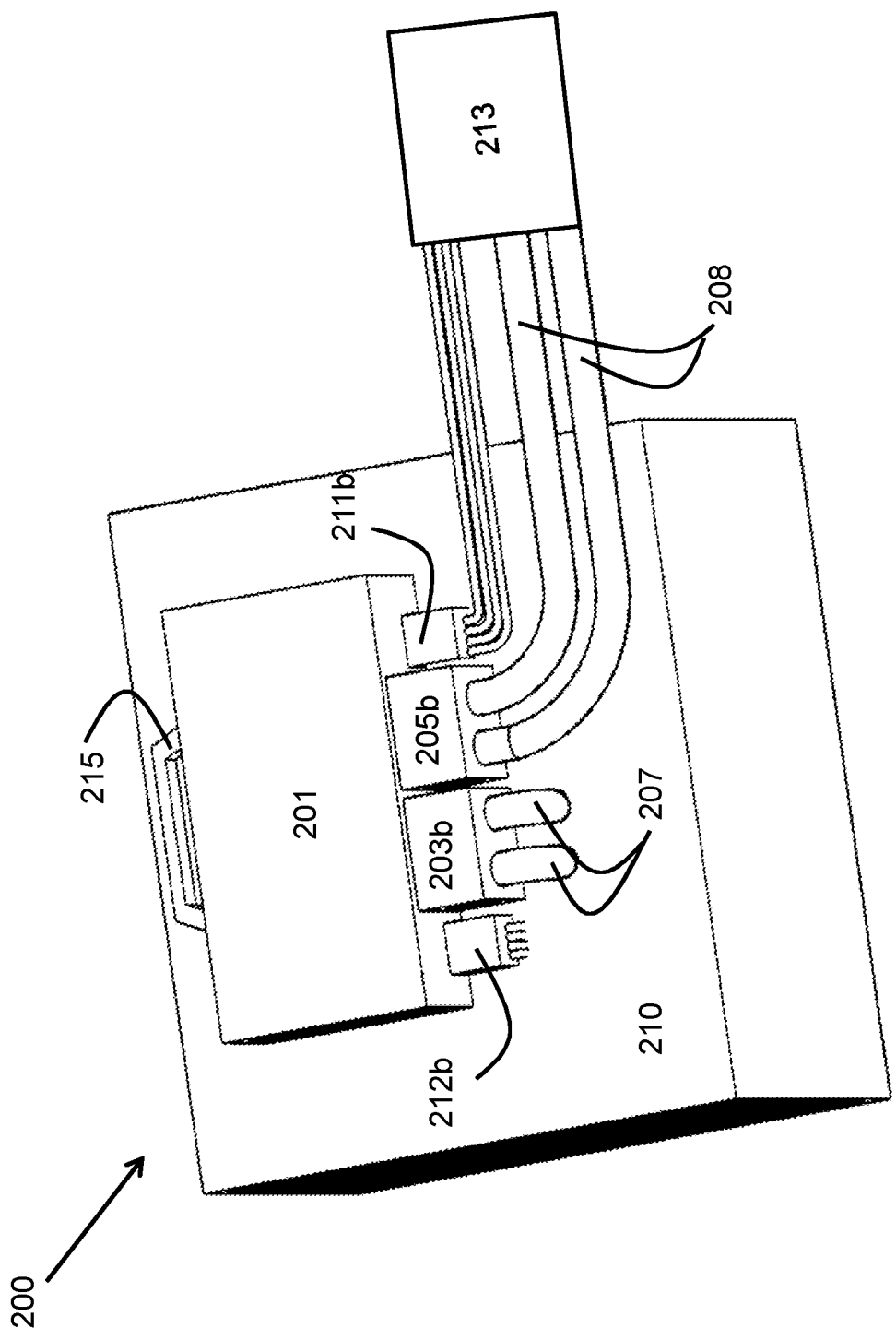
FIG. 2 is a schematic drawing illustrating an electrical energy storage system with the contactor box connected to the battery.
Figure 3:
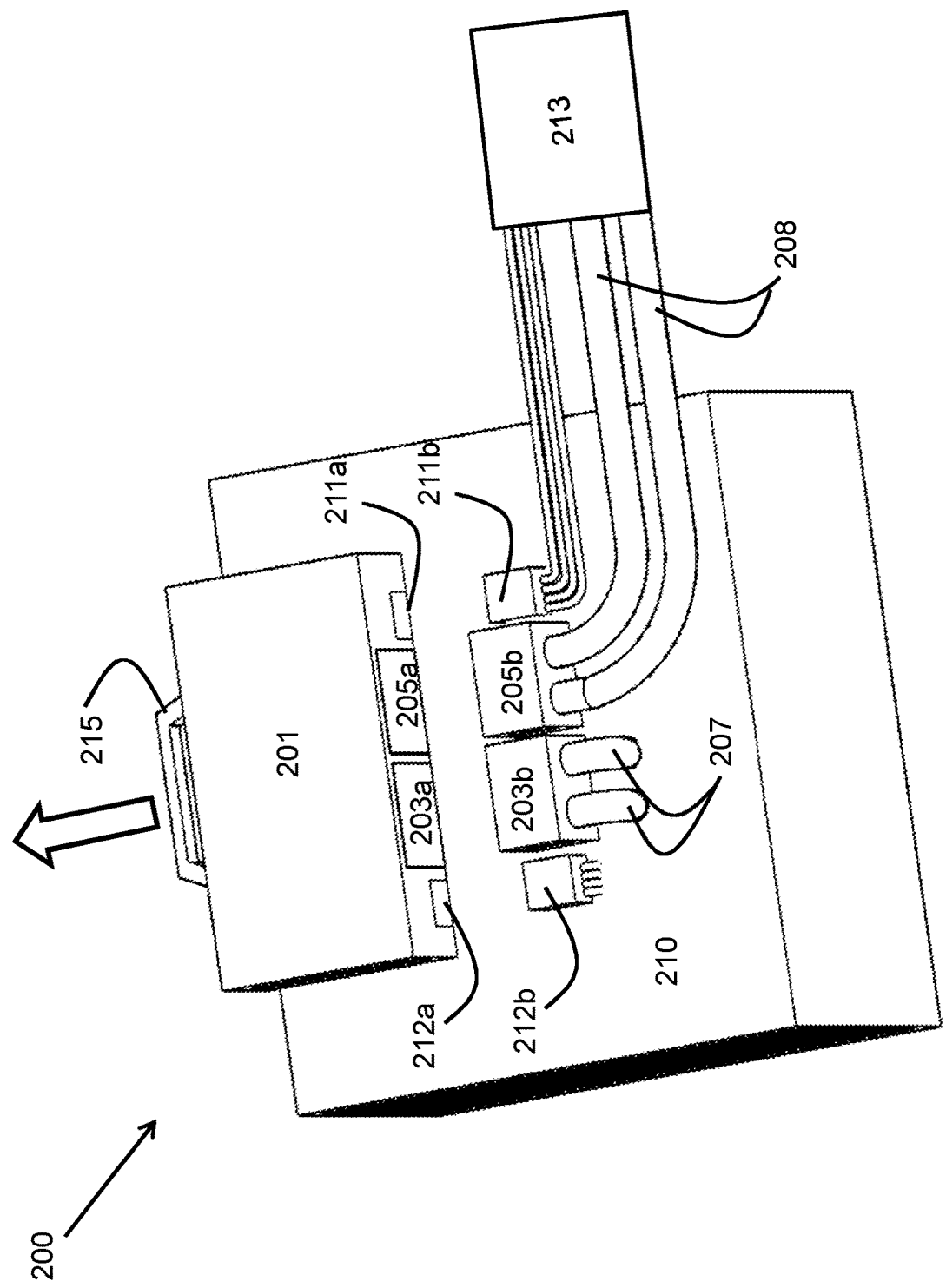
FIG. 3 is a schematic drawing illustrating an electrical energy storage system when the contactor box is removed from the battery.

The vehicle 100 comprises an electrical ESS 200, as illustrated in FIG. 2 and FIG. 3. The electrical ESS 200 may be located for example in the wheelbase area, under the cab, under the hood, in a trailer or any other suitable location.

The electrical ESS 200 comprises a contactor box 201 and a battery 210. FIG. 2 illustrates that the contactor box 201 and the battery 210 are connected. FIG. 3 illustrates that the contactor box 201 is removed from the battery 210.

The contactor box 201 may also be referred to as a service box. The battery 210, i.e. the power source of the vehicle 100, and one or more power consuming devices 213, e.g. the motor, comprised in the vehicle 100 are connected via the contactor box 201 that electrically connects and disconnects the battery 210 and the power consuming devices 213. The vehicle 100 may comprise other batteries or other energy sources in addition to or instead of the battery 210.

The contactor box 201 comprises intelligent components of the electrical ESS 200 such as contactors, a Battery Monitoring Unit (BMU), fuses, sensors, a Direct Current to Direct Current (DCDC) converter etc.

The contactor box 201 may be located at a position in the vehicle 100, and consequently in the electrical ESS 200, which is difficult to access for service personnel. There may be a need for removing the contactor box 201 in order to perform service, perform repair, replacement of the contactor box 201 with another contactor box 201 etc. Therefore, it is a need for improving the removal and insertion of the contactor box 201 despite its difficult location.

The contactor box 201 comprises a first ingoing high voltage connection 203a and a first outgoing high voltage connection 205a, see FIG. 3. High voltage may be in the range of 400-800 V or any other suitable voltage range sufficient for powering the vehicle 100. The first ingoing high voltage connection 203a may be referred to as a first ingoing traction voltage connection, a first ingoing high voltage interface or a first ingoing traction voltage interface. The first outgoing high voltage connection 205a may be referred to as a first outgoing traction voltage connection, a first outgoing high voltage interface or a first outgoing traction voltage interface. The first ingoing high voltage connection 203a and the first outgoing high voltage connection 205a are engaged and disengaged from the battery 210 with the removal and installation of the contactor box 201. The removal of the contactor box 201 may be performed in order to disconnect the high voltage connections to the electrical ESS 200.

The engagement of the first ingoing high voltage connection 203a and the first outgoing high voltage connection 205a may be separate, it may partly simultaneously or it may be completely simultaneously. With a separate engagement, the first ingoing high voltage connection 203a may be engage first, and then the first outgoing high voltage connection 205a may be engaged, or the other way around. With an at least partly simultaneous engagement, the first ingoing high voltage connection 203a and the first outgoing high voltage connection 205a may be almost completely engaged to the battery 210 in a first step, and then each of the connections 203a, 205a may be completely engaged to the battery 210 one at a time in a second and third step to be firmly engaged, either manually or with a control device. With a simultaneously engagement, both the first ingoing high voltage connection 203a and the first outgoing high voltage connection 205a are completely engaged to the battery 210 at the same time.

The disengagement of the first ingoing high voltage connection 203a and the first outgoing high voltage connection 205a may be separate, it may partly simultaneously or it may be completely simultaneously. With a separate disengagement, the first ingoing high voltage connection 203a may be disengaged first, and then the first outgoing high voltage connection 205a may be disengaged, or the other way around. With an at least partly simultaneous disengagement, the first ingoing high voltage connection 203a and the first outgoing high voltage connection 205a may be almost completely disengaged from the battery 210 in a first step, and then each of the connections 203a, 205a may be completely disengaged from the battery 210 one at a time in a second and third step to be completely disengaged, either manually or with a control device. With a simultaneously disengagement, both the first ingoing high voltage connection 203a and the first outgoing high voltage connection 205a are completely disengaged from the battery 210 at the same time.

The first ingoing high voltage connection 203a may be of any suitable type adapted to carry high Ampere loads, for example a female connection, a male connection, track, a rail etc. The first outgoing high voltage connection 205a may be of any suitable type, for example a male connection, a female connection, a track, a rail etc. The first ingoing high voltage connection 203a and the first outgoing high voltage connection 205a may be of the same type or of different types. For example, one connection may be a male connection and the other may be a female connection where the female connection is adapted to hold the male connection. In another example, one connection may be a track or a rail and the other connection may be designed such that it may slide into the track or rail.

There may be sealing around both connections adapted to withstand the harsh environment in a vehicle. Both connections may be of an International Protection (IP) class adapted for the vehicle 100. The first ingoing high voltage connection 203a and the first outgoing high voltage connection 205a may be of the same or different sizes. For example, the load may be split between more than one connection in the one direction and only one connection in the other direction.

The first ingoing high voltage connection 203a and the first outgoing high voltage connection 205a may be located on the same side of the contactor box 201. The first ingoing high voltage connection 203a and the first outgoing high voltage connection 205a may be located side by side on the same side of the contactor box 201. The side by side location may give a more efficient vehicle packaging. The first ingoing high voltage connection 203a and the first outgoing high voltage connection 205a may be located on the outside of the contactor box 201. Having the first ingoing high voltage connection 203a and the first outgoing high voltage connection 205a in parallel may be a prerequisite for them to be engaged and disengaged with the removal and installation of the contactor box 201.

The battery 210 is adapted to provide power to power consuming devices 213 comprised in the vehicle 100, e.g. to the motor. The battery 210 may be a rechargeable battery. The battery 210 may comprise one or more battery cells (not shown). The one or more battery cells may be comprised in a housing.

The battery 210 comprises a second ingoing high voltage connection 203b and a second outgoing high voltage connection 205b. The second ingoing high voltage connection 203b may be referred to as a second ingoing traction voltage connection, a second ingoing high voltage interface or a second ingoing traction voltage interface. The second outgoing high voltage connection 205b may be referred to as a second outgoing traction voltage connection, a second outgoing high voltage interface or a second outgoing traction voltage interface.

The engagement of the second ingoing high voltage connection 203b and the second outgoing high voltage connection 205b may be separate, it may parity simultaneously or it may be completely simultaneously. With a separate engagement, the second ingoing high voltage connection 203b may be engage first, and then the second outgoing high voltage connection 205b may be engaged, or the other way around. With an at least partly simultaneous engagement, the second ingoing high voltage connection 203b and the second outgoing high voltage connection 205b may be almost completely engaged to the contactor box 201 in a first step, and then each of the connections 203b, 205b may be completely engaged to the contactor box 201 one at a time in a second and third step to be firmly engaged, either manually or with a control device. With a simultaneously engagement, both the second ingoing high voltage connection 203b and the second outgoing high voltage connection 205b are completely engaged to the contactor box 201 210 at the same time.

The disengagement of the second ingoing high voltage connection 203b and the second outgoing high voltage connection 205b may be separate, it may partly simultaneously or it may be completely simultaneously. With a separate disengagement, the second ingoing high voltage connection 203b may be disengaged first, and then the second outgoing high voltage connection 205b may be disengaged, or the other way around. With an at least partly simultaneous disengagement, the second ingoing high voltage connection 203b and the second outgoing high voltage connection 205b may be almost completely disengaged from the contactor box 201 in a first step, and then each of the connections 203b, 205b may be completely disengaged from the contactor box 201 one at a time in a second and third step to be completely disengaged, either manually or with a control device. With a simultaneously disengagement, both the second ingoing high voltage connection 203b and the second outgoing high voltage connection 205b are completely disengaged from the contactor box 201 at the same time.

The second ingoing high voltage connection 203b may be of any suitable type, for example a female connection, a male connection, track, a rail etc. The second outgoing high voltage connection 205b may be of any suitable type, for example a male connection, a female connection, track, a rail etc. The second ingoing high voltage connection 203b and the second outgoing high voltage connection 205b may be of the same type or of different types. For example, one connection may be a male connection and the other may be a female connection where the female connection is adapted to hold the male connection. In another example, one connection may be a track or a rail and the other connection may be designed such that it may slide or run into the track or rail.

There may be sealing around both connections adapted to withstand the harsh environment in a vehicle. Both connections may be of an International Protection (IP) class adapted for the vehicle 100. The second ingoing high voltage connection 203b and the second outgoing high voltage connection 205b may be of the same or different sizes. For example, the load may be split between more than one connection in the one direction and only one connection in the other direction.

The second ingoing high voltage connection 203b and the second outgoing high voltage connection 205b may be located on the same side of the battery 210, e.g. on the top of the battery 210 as illustrated in FIG. 2 and FIG. 3. The second ingoing high voltage connection 203b and the second outgoing high voltage connection 205b may be located side by side on the same side of the battery 210. The second ingoing high voltage connection 203b and the second outgoing high voltage connection 205b may be located on the outside of the battery 210 or on the inside of the battery 210, e.g. partly or completely inside the battery 210. Both of the second ingoing high voltage connection 203b and the second outgoing high voltage connection 205b may not be completely inside the battery 210, as one of the connections is going to the power consuming device 213 of the vehicle 100. The battery 210 may have a special form factor making the contactor box 201 seem to be in the battery 210.

The first ingoing high voltage connection 203a of the contactor box 201 is adapted to be connected to the second ingoing high voltage connection 203b of the battery 210 and through which ingoing high voltage is provided from the battery 210. Thus, the first ingoing high voltage connection 203a is of a type that matches or is compatible with the second ingoing high voltage connection 203b of the battery 210. For example, the first ingoing high voltage connection 203a may be a male connection and the second ingoing high voltage connection 203b may be a female connection. The first ingoing high voltage connection 203a and the second ingoing high voltage connection 203b are adapted to be automatically disconnected from each other when the contactor box 201 is removed from the battery 210, e.g. when it is pulled out our lifted out from the battery 210. There is no need for any screwing or other type of manual disconnection between the first ingoing high voltage connection 203a and the second ingoing high voltage connection 203b in order for them to disconnect.

The first outgoing high voltage connection 205a of the contactor box 201 is adapted to be connected to a second outgoing high voltage connection 205b of the battery 210 and through which outgoing high voltage is provided out to at least one power consuming device 213 of the vehicle 100. The first outgoing high voltage connection 205a is of a type that matches or is compatible with the second outgoing high voltage connection 205b of the battery 210. For example, the first outgoing high voltage connection 205a may be a male connection and the second outgoing high voltage connection 205b may be a female connection. The first outgoing high voltage connection 205a and the second outgoing high voltage connection 205b are adapted to be automatically disconnected from each other when the contactor box 201 is removed from the battery 210, e.g. when it is pulled or lifted out from the battery 210. There is no need for any screwing or other type of manual disconnection between the first outgoing high voltage connection 205a and the second outgoing high voltage connection 205b in order for them to disconnect.

FIG. 2 and FIG. 3 shows an ingoing cable 207 between second ingoing high voltage connection 203b and the battery 210. Ingoing high voltage is transferred from the battery 210 through the ingoing cable 207, via the second ingoing high voltage connection 203b to the contactor box 201. There may be any suitable number of ingoing cables 207, e.g. one, two, three or more. The ingoing cable 207 may have any suitable length. The ingoing cable 207 may be encapsulated and built-in in the battery 210, which increases the safety level of the ingoing cable 207. The ingoing cable 207 may be in any suitable type of high voltage cable, e.g. busbars or similar.

FIG. 2 and FIG. 3 show an outgoing cable 208 between second outgoing high voltage connection 205*b* and the power consuming device 213. Outgoing high voltage is transferred from the battery 210 through the outgoing cable 208, via the second outgoing high voltage connection 205*b* to the power consuming device 213. There may be any suitable number of outgoing cables 208, e.g. one, two, three or more. The outgoing cable 208 may have any suitable length. The outgoing cable 208 may be encapsulated or built-in in the battery 210, which increases the safety level of the cable(s). The outgoing cable 208 may be of any suitable type of high voltage cable, e.g. busbars or similar.

Reference numbers 211*a*, 212*a*, 211*b* and 212*b* in FIG. 2 and FIG. 3 represent signalling connections adapted for signal cables. The first signalling connection 211*a* and the second signalling connection 212*a* are located side-by-side on the contactor box 201. The third signaling connection 211*b* and the fourth signalling connection 212*b* are located side-by-side on the battery 210. The first signalling connection 211*a* on the contactor box 201 is adapted to be connected to the third signalling connection 211*b* on the battery 210. The second signalling connection 212*a* on the contactor box 201 is adapted to be connected to the fourth signalling connection 212*b* on the battery 210. The signalling connections 211*a*, 212*a*, 211*b*, 212*b* are adapted to be connected and disconnected automatically with the insertion and removal of the contactor box 201.

The connections located on the battery 210, the second ingoing high voltage connection 203*b*, the second outgoing high voltage connection 205*b*, the third signaling connection 211*b* and the fourth signalling connection 212*b* are illustrated in FIGS. 2 and 3 as four separate units. However, some or all of these connections may be co-located or integrated. In one example, all four connections may be co-located in one unit. In another example, two of the connections may be co-located in one unit and the other two connections may be co-located in another unit. For example, the third signaling connection 211*b* and the second ingoing high voltage connection 203*b* may be co-located with each other and at least partly integrated with the battery 210. The second outgoing high voltage connection 205*b* and the fourth signalling connection 212*b* may be co-located with each other and may be connected to the battery 210 and/or the second ingoing high voltage connection 203*b* with any suitable joining device, e.g. a screw joint.

The contactor box 201 may comprise a handle 215. The handle 215 may be mounted on an outside of the contactor box 201. As exemplified in FIG. 2 and FIG. 3, the handle 215 may be mounted on the side of the contactor box 201, e.g. the opposite of the side on which the first ingoing high voltage connection 203*a* and the first outgoing high voltage connection 205*a* are located. The handle 215 enables a safe and controlled removal and insertion of the contactor box 201. The handle 215 may be of any size and shape suitable for a person to grip around it with its hand. Instead, or in addition to the handle 215, the contactor box 210 may comprise threads (not shown) where an external lifting eye (not shown) may be inserted and through which the contactor box 201 may be lifted or pulled away from the battery 210.

As mentioned earlier, FIG. 3 illustrates that the contactor box 201 is removed from the battery 210, i.e. removed from the vehicle 100. The arrow in FIG. 3 illustrates the direction of the movement when the contactor box 201 is removed, e.g. pulled or lifted out. As seen from FIG. 3, the second ingoing high voltage connection 203*b* and the second outgoing high voltage connection 205*b* remains on the battery 210 when the contactor box 201 is removed since they are mounted on the battery 210.

The contactor box 201 may be attached to the battery 210 by means of a contactor fastening device (not shown), e.g. screws, bolts, nails etc. This contactor fastening device must be released before removing the contactor box 201, and fastened after the contactor box 201 has been inserted.

The second outgoing high voltage connection 205*b* may be adapted to be mounted on the battery 210 via a battery fastening device (not shown), e.g. a screw, nail, bolt, using welding etc.

There may be a control device (not shown in any of the FIGS.) which is adapted to aid in the insertion and removal of the contactor box 201. The control device may be adapted to aid in engagement and disengagement in one or more of the connectors 203*a*, 203*b*, 205*a*, 205*b* or in all of them. For example, an operator may manually connect the contactor box 201 to the battery 210 in a first step. In case the operator did not manage to exactly connect the contactor box 201 and the battery 210, the control device may, in a second step, automatically make the final connection such that they are exact and securely connected to each other. This way, the risk for damaging the connections 203*a*, 203*b*, 205*a*, 205 is reduced, and also reducing the risk of damaging the signalling connections 211*a*, 211*b*, 212*a*, 212*b*. The control device may be mounted on the contactor box 201 or on the battery 210.

Summarized, the second ingoing high voltage connection 203*b* and the second outgoing high voltage connection 205*b* may be of the same type and firmly mounted on the battery 210. The second ingoing high voltage connection 203*b* is connected to the battery 210 and the second outgoing high voltage connection 205*b* is further routed to the vehicle 100, e.g. the power consuming device 213 comprised in the vehicle 100. The the second ingoing high voltage connection 203*b* and the second outgoing high voltage connection 205*b* may be linked only through the contactor box 201, and they are released and connected through a removal or an installation of the contactor box 201.

When removing a connection to the contactor box 201, the contactor box 201 is simply pulled or lifted out from the vehicle 100 whereby the ingoing- and outgoing connections 203*a*, 203*b*, 205*a*, 205*b* are released. The attachment, i.e. the contactor fastening device, (typically screws) between the contactor box 201 and the battery 210 must first be released.

The pulling or lifting of the contactor box 201 provides a quick and safe separation of hazardously voltage and current from the vehicle 100. With the present invention, the disconnection of the high voltage may be done even if there is a risk that voltage and current is present. High voltage power is shut off upon removal of a contactor box 201. The connection between the battery 210 and the vehicle 100 is removed when the contactor box 201 is removed.

The term "at least one of A and B" should be understood to mean "only A, only B, or both A and B.", where A and B are any parameter, number, indication used herein etc.

The term "adapted to" used herein may also be referred to as "arranged to", "configured to", "capable of" or "operative to".

It is to be understood that the present invention is not limited to the embodiments described herein and illustrated in the drawings; rather, the skilled person will recognize that many changes and modifications may be made within the scope of the appended claims.

The invention claimed is:

1. A battery for an electrical energy storage system of an at least partly electrical vehicle, the battery comprises: a first ingoing high voltage connection adapted to be connected to a second ingoing high voltage connection of a contactor box and through which ingoing high voltage is transferred from the battery; and a first outgoing high voltage connection adapted to be connected to a second outgoing high voltage connection of the contactor box and through which outgoing high voltage is provided out to at least one power consuming part of the vehicle; wherein the first ingoing high voltage connection and the first outgoing high voltage connection are adapted to be disengaged from the contactor box when the contactor box is removed from the vehicle and adapted to be engaged with the contactor box when the contactor box is inserted into the vehicle.

2. The battery according to claim 1, wherein the first outgoing high voltage connection is adapted to be mounted on the battery via a battery fastening device.

3. The battery according to claim 1, wherein the first ingoing high voltage connection and the first outgoing high voltage connection are adapted to be located on the same side of the battery.

4. The battery according to claim 1, wherein the first ingoing high voltage connection and the first outgoing high voltage connection are located on an outside or an inside of the battery.

5. The battery according to claim 1, wherein the first ingoing high voltage connection and the first outgoing high voltage connection are adapted to be simultaneously disengaged from the contactor box when the contactor box is removed from the vehicle and adapted to be simultaneously engaged with the contactor box when the contactor box is inserted into the vehicle.

6. An electrical energy storage system for an at least partly electrical vehicle comprising a battery according to claim 1 and a contactor box.

7. An at least partly electrical vehicle comprising: a contactor box and a battery according to claim 1.

* * * * *